United States Patent [19]
Deyoreo et al.

[11] Patent Number: 5,301,458
[45] Date of Patent: Apr. 12, 1994

[54] INSECT KILLER

[75] Inventors: Sal G. Deyoreo, Boston; David P. Stevens, Billerica, both of Mass.

[73] Assignee: Armatron International, Inc., Melrose, Mass.

[21] Appl. No.: 57,008

[22] Filed: May 3, 1993

[51] Int. Cl.$^5$ .................. A01M 1/08; A01M 1/22
[52] U.S. Cl. .................................. 43/139; 43/112; 43/113
[58] Field of Search .................. 43/112, 113, 139

[56] References Cited

U.S. PATENT DOCUMENTS

| | | | |
|---|---|---|---|
| 3,319,374 | 5/1967 | Gawne | 43/139 |
| 4,121,371 | 10/1978 | Kaphengst et al. | 43/112 |
| 5,020,270 | 6/1991 | Lo | 43/112 |

Primary Examiner—Paula A. Bradley
Assistant Examiner—Jeanne M. Elpel
Attorney, Agent, or Firm—Samuels, Gauthier & Stevens

[57] ABSTRACT

An insect attracting and killing device employs a translucently diffused light source to attract insects and operates in conjunction with a fan-driven air flow to draw the thus attracted insects inwardly into contact with an electrically charged grid.

14 Claims, 3 Drawing Sheets

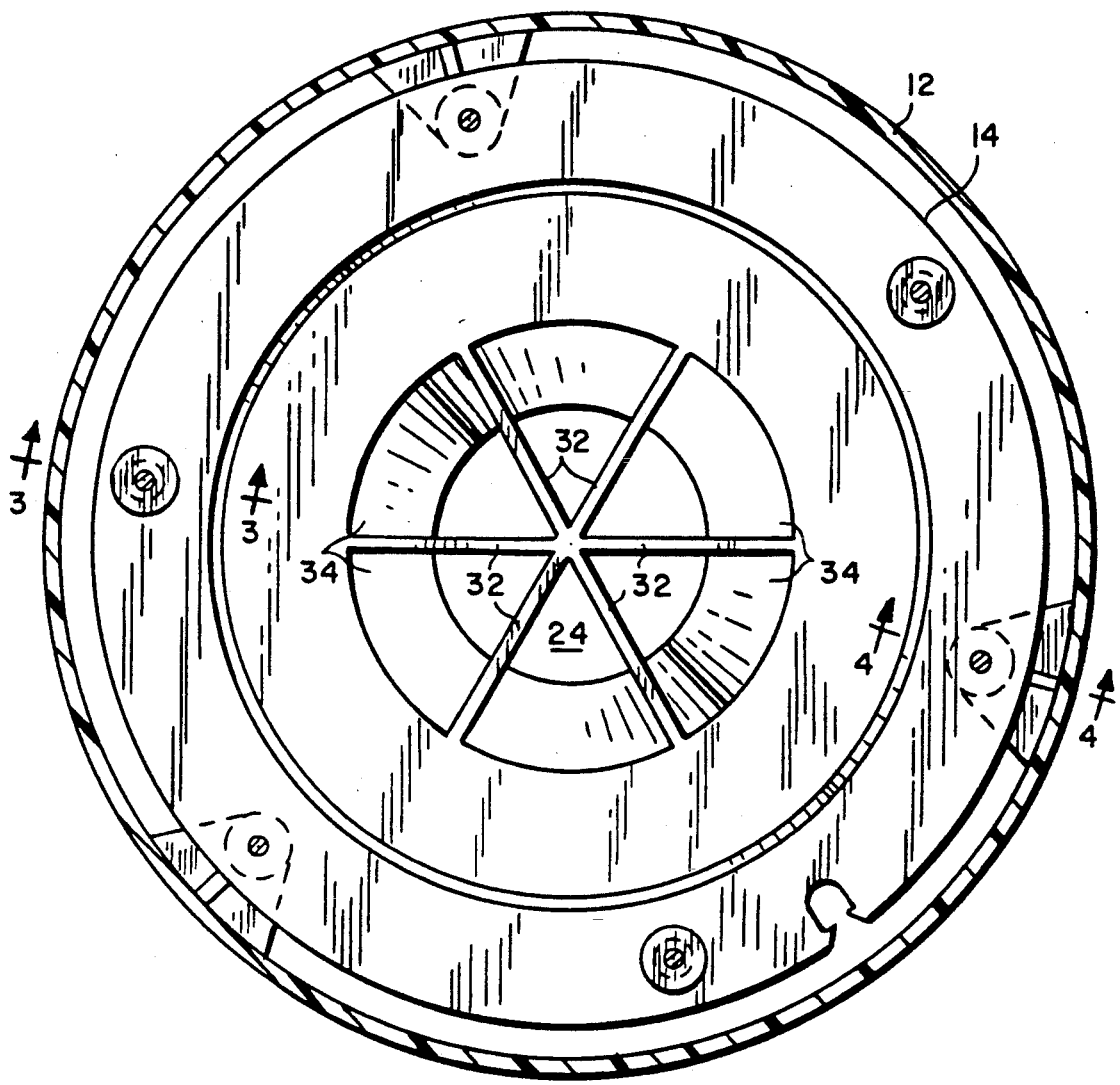
FIG.2
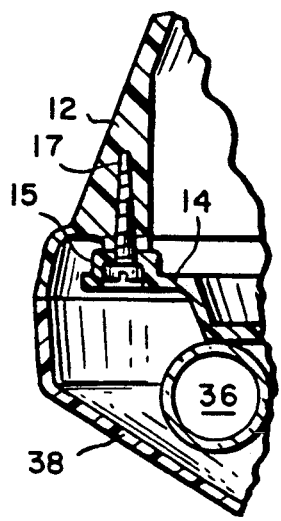
FIG.3
FIG.4
FIG.5

INSECT KILLER

BACKGROUND OF THE INVENTION

1. Field of the Invention

This invention relates generally to insect attracting and exterminating devices, and is concerned in particular with that class of such devices which employs a light source to attract insects and which operates in conjunction with a fan-driven air flow and an electrically charged grid to destroy the thus attracted insects.

2. Description of the Prior Art

Insect attracting and killing devices of the type referred to above are well known, as evidenced, for example, by the disclosures in U.S. Pat. Nos. 3,041,773 (Gagliano) and 3,319,374 (Gawne). Such devices suffer from various disadvantages, including inefficient air flow generation and/or usage, and fouling of fan blades by accumulations of dead insects.

SUMMARY OF THE PRESENT INVENTION

A general objective of the present invention is to provide an improved insect attracting and killing device, wherein fan-generated air flow is more efficiently utilized in combination with a translucently-diffused light source to draw insects towards and into contact with an electrically charged cylindrical killing grid. The fan-driven air flow is axially directed through the cylindrical grid, thereby inducing radial air flow into the grid from areas surrounding the device. The thus induced air flow entrains insects and thus enhances overall efficiency.

Another objective of the present invention is to avoid or at least substantially minimize any fouling of the fan blades with dead insects. To this end, the fan is advantageously positioned upstream from the killing grid.

Still another objective of the present invention is to enhance visual attraction of insects into the killing zone of the device by surrounding the killing grid with translucently diffused ultraviolet light, and/or by employing an air-driven visually attractive rotatable element within the killing grid.

These and other objects and advantages of the present invention will become more apparent as the description proceeds with reference to the accompanying drawings.

BRIEF DESCRIPTION OF THE DRAWINGS

FIG. 2 is a horizontal sectional view taken on line 2—2 of FIG. 1;

FIGS. 3 and 4 are sectional views respectively taken along lines 3—3 and 4—4 of FIG. 2;

FIG. 5 is a sectional view taken along line 5—5 of FIG. 1; and

DETAILED DESCRIPTION OF PREFERRED EMBODIMENT

Figure 1:
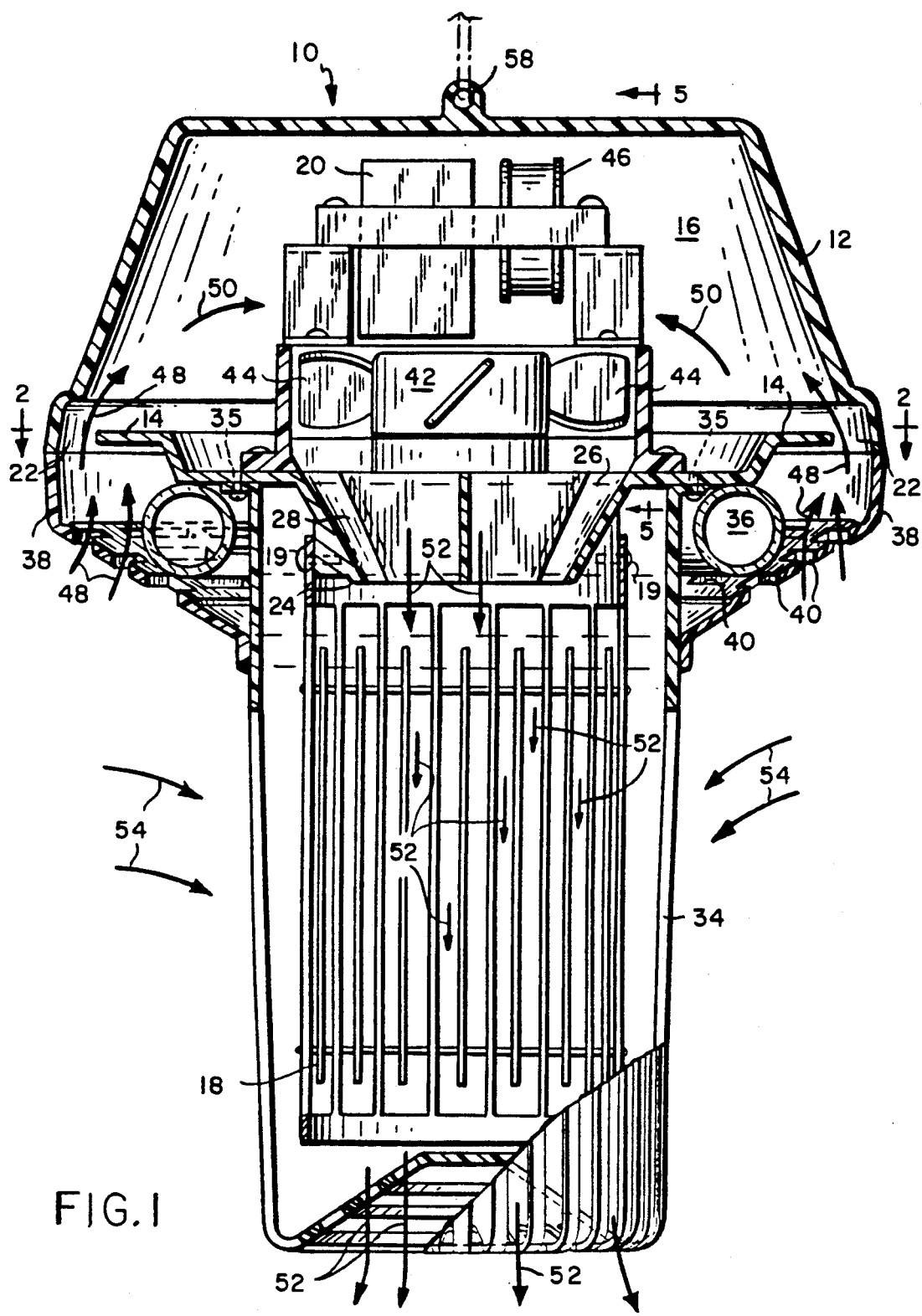
FIG. 1 is a vertical cross-sectional view of one embodiment of an insect attracting and killing device according to the present invention, with a portion of the outer dielectric cage broken away to better illustrate internal components.

Referring now to the drawings, an insect attracting and killing device 10 according to the present invention is shown. The insect attracting and killing device 10 comprises a housing having a dome-shaped roof 12 which overlies and coacts with a circular floor 14 to define an upper compartment 16. FIG. 3 illustrates the connecting means between the floor 14 and the dome-shaped roof 12. In particular, the floor 14 includes a plurality of circumferentially spaced upwardly projecting bosses 15 secured to the roof 12 by screws 17. Below the floor 14 is a cylindrical electrically conductive killing grid 18, preferably of the type disclosed in U.S. Pat. No. 4,907,365 (Conigliaro). Located in the upper compartment 16 is a transformer 20 to energize the electrically conductive killing grid 18.

A circular inlet opening 22 is defined in the housing 12 between the interior of the dome-shaped roof 12 and the outer edge of the horizontal floor 14 The horizontal floor 14 has a centrally located outlet opening 24 as further illustrated in FIG. 2. Surrounding and depending downwardly from the outlet opening 24 is an inverted truncated conical nozzle 26 formed as an integral part of the floor 14. The lower end 28 of the nozzle 26 protrudes downwardly into the top of the electrically conductive killing grid 18. Inside the nozzle 26 are radially disposed stationary vanes 32 which divide the nozzle into sections 34. The cylindrical electrically conductive killing grid 18 is aligned axially with the outlet opening 24 and the nozzle 26. A cylindrical non-conducting protective cage 34 depends downward from the floor 14 to surround the killing grid 18. The cage 34 is attached to the floor 14 as at 35 and the killing grid 18 is attached to the nozzle 26 as at 19.

To visually attract insects into the killing zone of the device, an ultraviolet light source 36 is positioned below the floor 14. The ultraviolet light source 36 preferably comprises a circular bulb surrounding the upper end of the killing grid 18. A translucent cover 38 encloses the circular light bulb 36. The translucency of the cover diffuses the light in the area of the killing zone into a soft glow and is such that the outline of the bulb is not discernable through the cover. The cover 38 has apertures 40 to allow for air flow through the inlet opening 22 and into the upper compartment 16.

As can be best seen by additional reference to FIG. 4, the floor 14 further includes downwardly disposed circumferentially spaced bosses 39 to which the cover 38 is secured by screws 41.

A fan 42 with blades 44 and a motor 46 to drive the fan are located in the compartment 16 above and aligned axially with the outlet opening 24. Operation of the fan 42 draws ambient air through apertures 40 in the cover 38 and then through the inlet opening 22 as illustrated by arrows 48. The air flows through the compartment 16 as illustrated by arrows 50 and continues downwardly through the nozzle 26. The radially disposed stationary vanes 32 which section off the nozzle 26 stabilize the air flow generated by fan 42. The air flow is directed downwardly and axially through the cylindrical electrically conductive killing grid 18 as indicated by arrows 52. This downward air flow entrains air radially inwardly from the surrounding area through the electrically conductive killing grid 18 as illustrated by arrows 54. Consequently, as insects approach the vicinity of the device, being attracted by the diffused light, the air flow being entrained into the killing device overcomes the insects, natural defensive reaction to escape and draws them directly into contact with the electrically conductive killing grid 18. Overall efficiency of the device is thus markedly enhanced by forcibly propelling insects into the killing zone.

The top of the dome-shaped roof 12 has an eye 58 which can be used to suspend the insect killing device 10.

Figure 6:
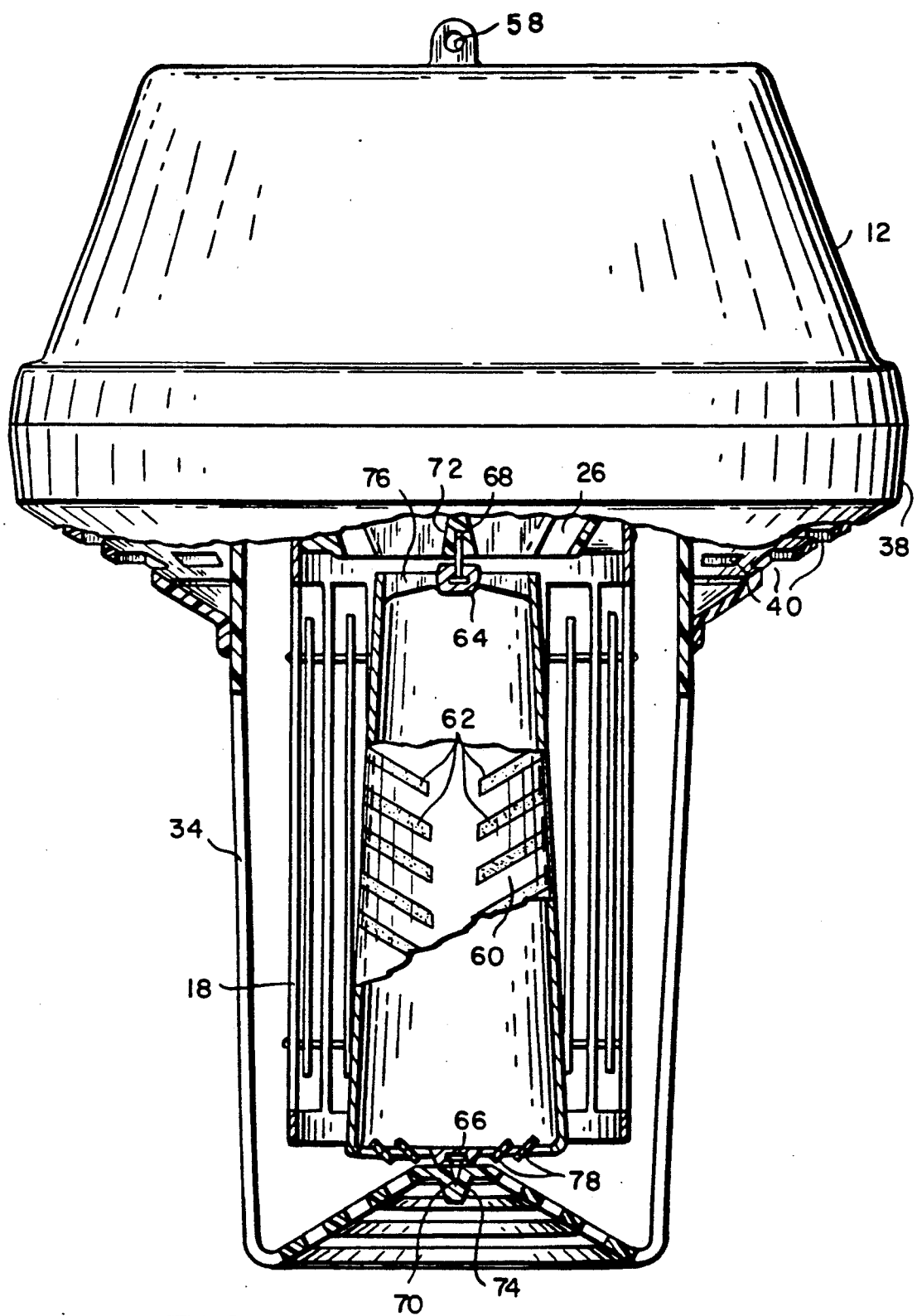
FIG. 6 is a side view, with portions broken away, of an insect attracting and killing device according to an alternative embodiment of the present invention.

As illustrated in FIG. 6, an alternative embodiment of the killing device includes a spinner 60 within the killing grid 18 to further augment visual attraction of insects into the killing zone of the device. Preferably, the spinner has colored strips 62 or the like to further enhance visual attraction of insects.

The spinner 60 is tubular and preferably tapered from top to bottom. Centrally located at the top and bottom of the spinner are two axial hubs 64,66. Pins 68,70 rotatably support the hubs respectively on the nozzle 26 as at 72 and on the base of the nonconducting cage 34 as at 74. Along the top and bottom of the spinner 60 are radially webs 76 and fins 78, respectively, which react to the downward air flow to generate the desired rotational motion of the spinner.

The foregoing description has been set forth merely to illustrate the invention and is not intended to be limiting. Since modifications of the described embodiments incorporating the spirit and substance of the invention may occur to persons skilled in the art, the scope of the invention should be limited solely with reference to the appended claims and equivalents.

We claim:

1. An insect killing device comprising:
   a housing having a roof overlying and coacting with a floor to define an upper compartment;
   an inlet opening in said housing communicating with said compartment;
   an outlet opening in said floor;
   an electrically conductive killing grid aligned axially with said outlet opening and extending downwardly from said floor;
   means in said compartment for energizing said grid;
   a light source underlying said floor and positioned to visually attract insects towards said grid; and
   fan means in said compartment for drawing air into said compartment via said inlet opening and for expelling air from said compartment in a stream directed downwardly and axially through said killing grid.

2. The insect killing device of claim 1, further comprising a dielectric protective cage extending downwardly from said floor and surrounding said killing grid.

3. The insect killing device of claim 2, wherein said protective cage is cylindrical.

4. The insect killing device of claim wherein said electrically conductive killing grid is cylindrical.

5. The insect killing device of claim 1, wherein said inlet opening is defined by a space between the outer edge of said floor and the periphery of said roof.

6. The insect killing device of claim 1, wherein said light source is ultraviolet and comprises a circular bulb surrounding the axis of said killing grid.

7. The insect killing device of claim 1, wherein said fan means includes fan blades rotatable about an axis coincident with the axis of said killing grid.

8. The insect killing device of claim 7, further comprising an inverted truncated conical nozzle surrounding said outlet opening and protruding downwardly into said killing grid.

9. The insect killing device of claim 8, further comprising radially disposed stationary vanes in said nozzle.

10. The insect killing device of claim 6, further comprising a translucent cover coacting with said floor to enclose said bulb.

11. The insect killing device of claim 10, wherein said cover is provided with openings communicating with said inlet opening and through which air may be drawn into said compartment by said fan means.

12. The insect killing device of claim 10, wherein said cover is sufficiently translucent such that the outline of said bulb is not discernable.

13. The insect killing device of claim 1, further comprising a spinner located within and mounted for rotation about the axis of the killing grid, and means responsive to said air stream for rotating said spinner about said axis.

14. The insect killing device of claim 1, further includes means for suspending said killing device from an overlying support.

* * * * *